(12) United States Patent
Bendek et al.

(10) Patent No.: US 10,255,827 B2
(45) Date of Patent: Apr. 9, 2019

(54) INJECTOR TRAINING DEVICE

(71) Applicant: CAREBAY EUROPE LTD., Sliema (MT)

(72) Inventors: Antonio Bendek, Wellington, FL (US); Lucio Giambattista, Lighthouse Point, FL (US); Kuo-Chiang Tang, New Taipei (TW)

(73) Assignee: SHL MEDICAL AG, Zug (CH)

( * ) Notice: Subject to any disclaimer, the term of this patent is extended or adjusted under 35 U.S.C. 154(b) by 333 days.

(21) Appl. No.: 15/112,479

(22) PCT Filed: Jan. 14, 2015

(86) PCT No.: PCT/EP2015/050563
§ 371 (c)(1),
(2) Date: Jul. 19, 2016

(87) PCT Pub. No.: WO2015/110327
PCT Pub. Date: Jul. 30, 2015

(65) Prior Publication Data
US 2016/0335920 A1 Nov. 17, 2016

(30) Foreign Application Priority Data
Jan. 21, 2014 (SE) ........................... 1450054

(51) Int. Cl.
*G09B 23/28* (2006.01)
(52) U.S. Cl.
CPC ................... *G09B 23/285* (2013.01)

(58) Field of Classification Search
USPC ........ 434/262, 267, 268, 272; 604/134, 135, 604/192–196
See application file for complete search history.

(56) References Cited

U.S. PATENT DOCUMENTS

| | | | | |
|---|---|---|---|---|
| 5,071,353 A | * | 12/1991 | van der Wal | A61M 5/2033 434/262 |
| 5,567,160 A | * | 10/1996 | Massino | G09B 23/285 434/262 |
| 7,682,155 B2 | * | 3/2010 | Raven | G09B 23/285 434/262 |

(Continued)

FOREIGN PATENT DOCUMENTS

| | | |
|---|---|---|
| CN | 1933864 A | 3/2007 |
| CN | 101087626 A | 12/2007 |

(Continued)

OTHER PUBLICATIONS

International Search Report and Written Opinion for Int. App. No. PCT/EP2015/050563, dated Apr. 21, 2015.

*Primary Examiner* — Kurt Fernstrom
(74) *Attorney, Agent, or Firm* — McDonnell Boehnen Hulbert & Berghoff LLP (57) ABSTRACT

An auto-injection training device is presented that allows a user to simulate an injection procedure that occurs with a real-life commercial auto-injector containing a prefilled container of medicament. The training device is resettable, thus allowing the user to perform multiple simulations. Each simulation provides both audible and visual signals to the user that the injection procedure is in progress.

10 Claims, 7 Drawing Sheets

(56) References Cited

U.S. PATENT DOCUMENTS

| | | | |
|---|---|---|---|
| 8,714,984 B2 * | 5/2014 | Mach | A61M 5/20 |
| | | | 434/267 |
| 9,443,445 B2 * | 9/2016 | Laurusonis | G09B 23/285 |
| 9,911,364 B2 * | 3/2018 | Baker | G09B 23/285 |
| 10,013,895 B2 * | 7/2018 | Swanson | G09B 23/285 |
| 2012/0015336 A1 | 1/2012 | Mach | |
| 2012/0107783 A1 | 5/2012 | Julian et al. | |
| 2013/0280687 A1 | 10/2013 | Edwards et al. | |

FOREIGN PATENT DOCUMENTS

| | | | |
|---|---|---|---|
| CN | 102231246 A | 11/2011 | |
| CN | 102325559 A | 1/2012 | |
| CN | 102448520 A | 5/2012 | |
| CN | 102665805 A | 9/2012 | |
| CN | 103328026 A | 9/2013 | |
| EP | 2468329 A1 | 6/2012 | |
| JP | 106-063134 A | 3/1994 | |
| JP | 2008-521482 A | 6/2008 | |
| JP | 2011-523873 A | 8/2011 | |
| JP | 2011-194069 A | 10/2011 | |
| JP | 2013-530024 A | 7/2013 | |
| TW | 200733995 A | 9/2007 | |
| TW | 201207785 A | 2/2012 | |
| WO | 2012/003516 A2 | 1/2012 | |
| WO | 2013012055 A1 | 1/2013 | |
| WO | 2013/048310 A1 | 4/2013 | |
| WO | 2013/130973 A1 | 9/2013 | |

* cited by examiner

FIG. 7

INJECTOR TRAINING DEVICE

CROSS-REFERENCE TO RELATED APPLICATIONS

The present application is a U.S. National Phase Application pursuant to 35 U.S.C. § 371 of International Application No. PCT/EP2015/050563 filed Jan. 14, 2015, which claims priority to Swedish Patent Application No. 1450054-0 filed Jan. 21, 2014. The entire disclosure contents of these applications are herewith incorporated by reference into the present application.

FIELD OF THE DISCLOSURE

The present invention relates to a training device that simulates a real-life injection procedure particular as it relates to injection time and the tactile feel of a real drug-filled commercial injection device. The training device is specifically designed to simulate an auto-injector that is activated by application of a needle shield to an injection site.

BACKGROUND

Injection training devices are known, for example, U.S. Patent Appl. 2012/0015336, discloses an injection training device to simulate both a manual syringe and an auto-injector. This device unfortunately does not audibly signal the user that the simulated injection procedure is in progress. There is only an initial sound when the device is fired and then a sound at the end of the simulated injection, with no sound emitted during the injection process. Likewise, there is no visual indication that the simulated injection procedure is in progress. There is only visual indication that the device is ready for an injection and then a different indication the simulated procedure is complete. There is no visual signal as the procedure progresses. Additionally, this prior known simulator does not include a so-called dummy or demo syringe to simulate the frictional resistive forces caused by the interaction of a movable piston with the sidewalls of the container barrel. The absence of simulating the resistive forces in these prior known training devices is a disadvantage to patient because they will not experience a realistic tactile feel of a true simulated injection.

In light of the deficiencies of the known injection training devices, there exists a need for more realistic training devices that closely simulate real-life commercial auto-injection devices. Our invention satisfies these needs by providing a training device that provides a user or patient being trained with tactile and visual feedback of the simulated injection procedure as it occurs in real time. Other benefits and objectives of our invention will become evident from the following more detailed description and included drawings.

SUMMARY

One primary purpose of our training device is to mimic or simulate the functionality of a real-life auto-injection device containing a pre-filled container of medicament, preferably a pre-filled syringe. This allows the patient or a device user to practice with a non-real, non-filled drug device in order to overcome a variety of possible mistakes that can occur when using an actual real commercial device, especially for the first time. One such mistake includes wasting the drug or inadvertently dispensing the drug because the patient did not follow the correct injection procedure. Another benefit of our training device is that allows a new patient or user to overcome the physiological fear that can typically result from having to perform self-injections.

One aspect of out training device for simulating an injection procedure of a real-life auto-injection device having a pre-filled container of medicament involves a device comprising an elongate outer housing having an inner surface, a proximal end and a distal end, where the housing contains an empty demo or dummy container axially and rotationally fixed relative to the outer housing. Preferably, this demo container is fabricated with the same materials of construction as real-life pre-filled containers of medicament, such as syringes and cartridges. A plunger assembly having a plunger rotationally fixed relative to the outer housing is positioned within the housing such that a distal portion of the plunger is slidable within the demo container. A biasing element is used to move the plunger assembly distally when the training device is activated. Preferably a coiled spring is used having a distal end fixed axially relative to the outer housing and a proximal end attached to the plunger assembly such that the coiled spring is in an extended tensed configuration when the plunger assembly is in a cocked position.

A rotary damper gear assembly attached to a proximal end of the plunger assembly that has a gear rotatably engaged with a rack axially fixed to the inner surface of the outer housing. This rotary damper gear assembly allows the plunger assembly to move distally in a controlled constant torque motion that simulates the resistance experienced in a real-life injection procedure. A rotatable lock is included having a first position where the lock is engaged directly with the plunger to prevent the plunger from moving axially. The lock has a second position where the lock is disengaged from the plunger to allow the plunger to move axially relative to the lock and outer housing when the training device is activated. Movable shield is used to trigger the cocked training device when the shield is pressed against a pretend injection site.

Our training device is also characterized in that it includes a combination cap and reset tool (mandrel), a scrolling ribbon as a visual progress indicator, and a clicker track for audibly signaling the user that the injection procedure is in progress. The cap with attached reset tool allows a user to activate or push the plunger rod proximally relative to the main body of the trainer device in order to activate or cock the device. As the plunger rod is pushed the one or more attached specialized springs, for example constant force flat coiled springs, are caused to unwind or extend inside the device into a standby position where the plunger rod and spring(s) are locked by a rotatable lock positioned inside a stationary lock carrier, where the lock contains bearing surfaces configured to engage the shield as it is pushed proximally during application to a pretend injection site.

Activation occurs when patient or user removes the cap/reset tool and places the distal end of the shield against skin and pushes it downward while holding the device in this position for approximately 5 seconds. This action causes the lock to rotate out of locking engagement with the plunger assembly causing the plunger to move distally by the rewinding force of the plunger spring. The one or more springs retract into a coil from its extended position to come to the final resting position. The device can then be reset or re-activated again and again for demonstration practices at least for up to maximum of 100 repeated times.

Our training device not only provides the look and feel of a real-life auto-injector, it also simulates the audible and visual effects of a commercial injector to further patient awareness and education, as well as, training the patient to understand and be ready to use the actual real device. The audible sound effect is generated by one or more flexible arms that move with the plunger assembly relative to axially fixed click tracks. As the simulated injection procedure progresses the flexible arm clicks over a longitudinal row of teeth generating an audible "clicking" sound preferably where each "click" represents one unit dose of simulated dispensed medicament. The visual effect is generated by scrolling ribbon in front of a small window on top or proximal end of the device indicating the entire simulated injection process from the start to the finish.

The use of our training device avoids the need to practice injections with a medicament filled syringe or cartridge inside a real commercial device. In a real device once the activation takes place, the drug will be dispensed and there are no remedies to prevent the wasting or stopping the process once the activation started.

These as well as other advantages of the various aspects of the injection training device, and the manner of attaining them, will become apparent to those of ordinary skill in the art by reading the following detailed description, with appropriate reference to the accompanying drawings.

BRIEF DESCRIPTION OF THE DRAWINGS

The invention will now be described in more detail and with reference to the appended drawings in which.

DETAILED DESCRIPTION

As used herein, the term "demo or dummy container" encompasses all types of containers that simulate commercially available medicament containers suitable for injectable liquid composition, including prefilled syringes, cartridges and ampoules. Concerning the terms "distal" and "proximal" they refer to points that are closer to and further away from the injection site, respectively. So, for example, the cap of the reusable auto-injection training device described herein is located at the distal end of the training injector and the ribbon window is located at the proximal end.

The trainer system is designed to be used as a teaching, education, simulation and a training device based on auto injectable targeted drug delivery systems and principles. The invention disclosed herein improves upon patient education and training of usage of a complex mechanical device. This type of trainer device or systems in that it greatly increases the comfort and physiological capability and erasing fear factor from cannulas or needles by patients for the purpose of injection. This trainer allows the patient to use this device instead of actual device by practicing as many times as possible to get used to the methods of delivery of a particular drug without exposing the patient to the actual needle during the practices. In addition, the trainer allows the patient in full comfort and without any fear to use the device in place of the actual device as many times and repeatedly without concern to waiting the actual medication in the real device. Furthermore by playing with and getting used to the trainer device which is close to an identical reproduction of the actual device will allow the patient to be in charge of his or her own comfort level and apprehension of approaching when it comes to use the actual auto injectable device for drug delivery. In general, most patients have an unsubstantiated fear of needles or cannulas. Even though most of the auto injectable needles will have a smaller gage needle than ones used in blood transfusion, however still a proper training and usage of auto injectable is paramount to wellbeing of and comfort of the patient.

Figure 1:
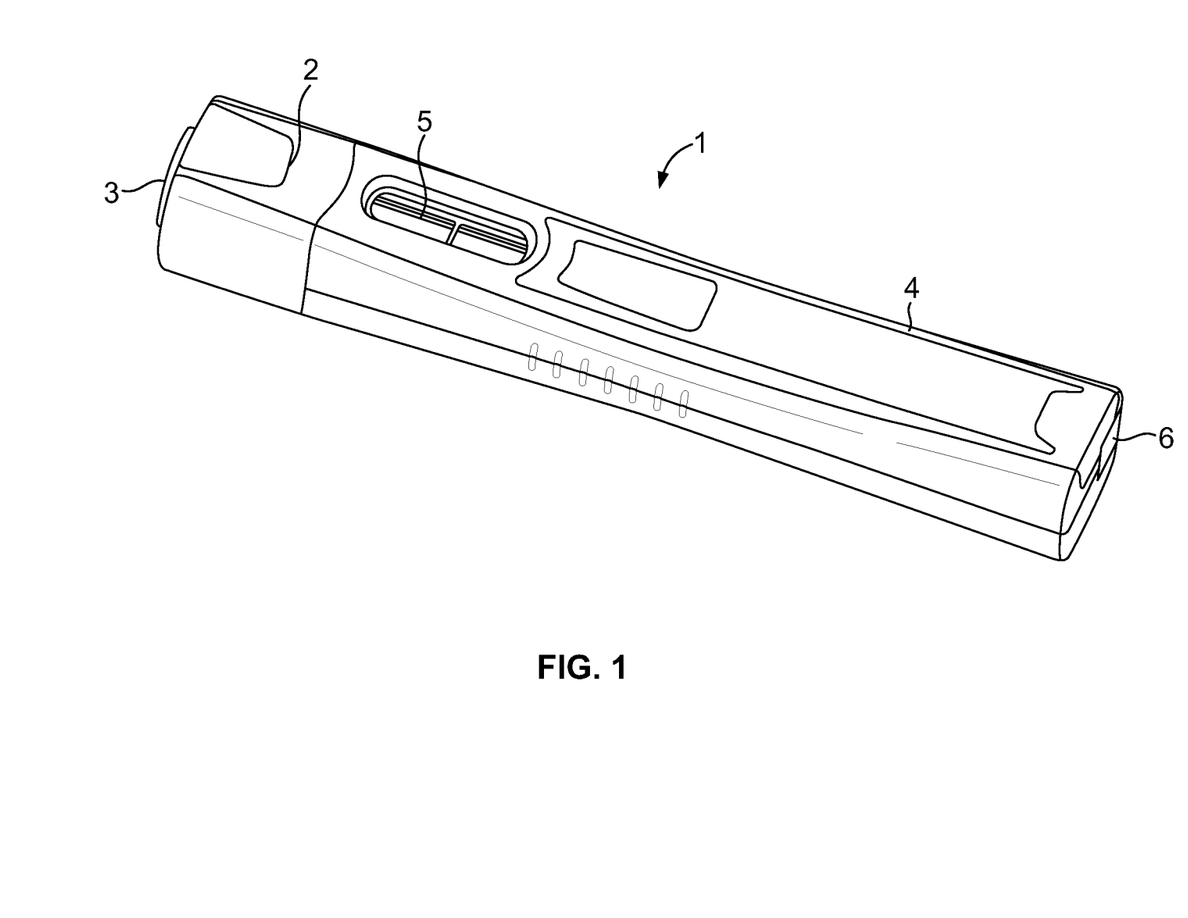
FIG. 1 is a perspective view of an embodiment of the training injector according to the invention in the fully assembled state.
Figure 2:
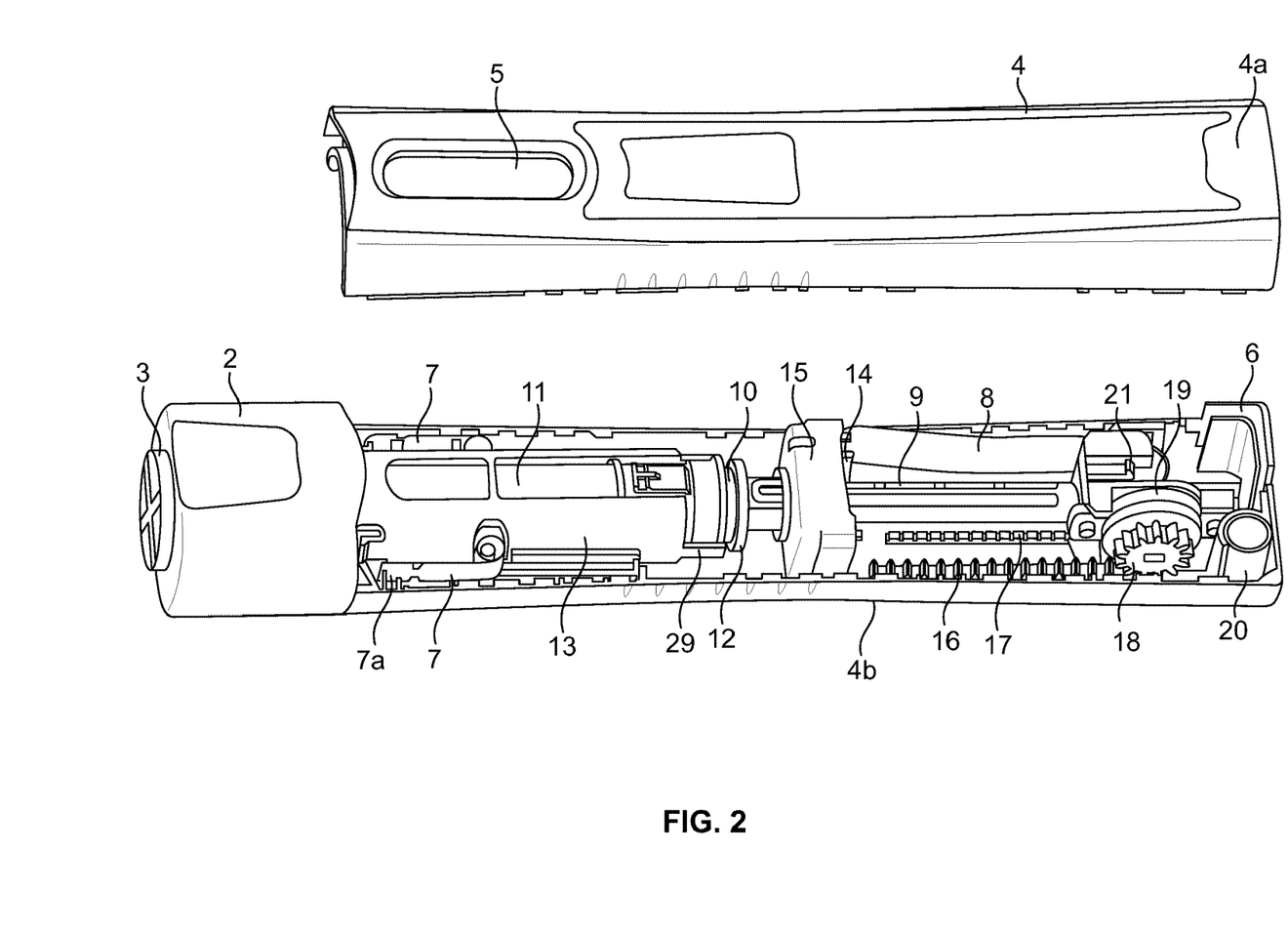
FIG. 2 is a perspective view of the embodiment of FIG. 1 in a partially disassembled state.
Figure 3:
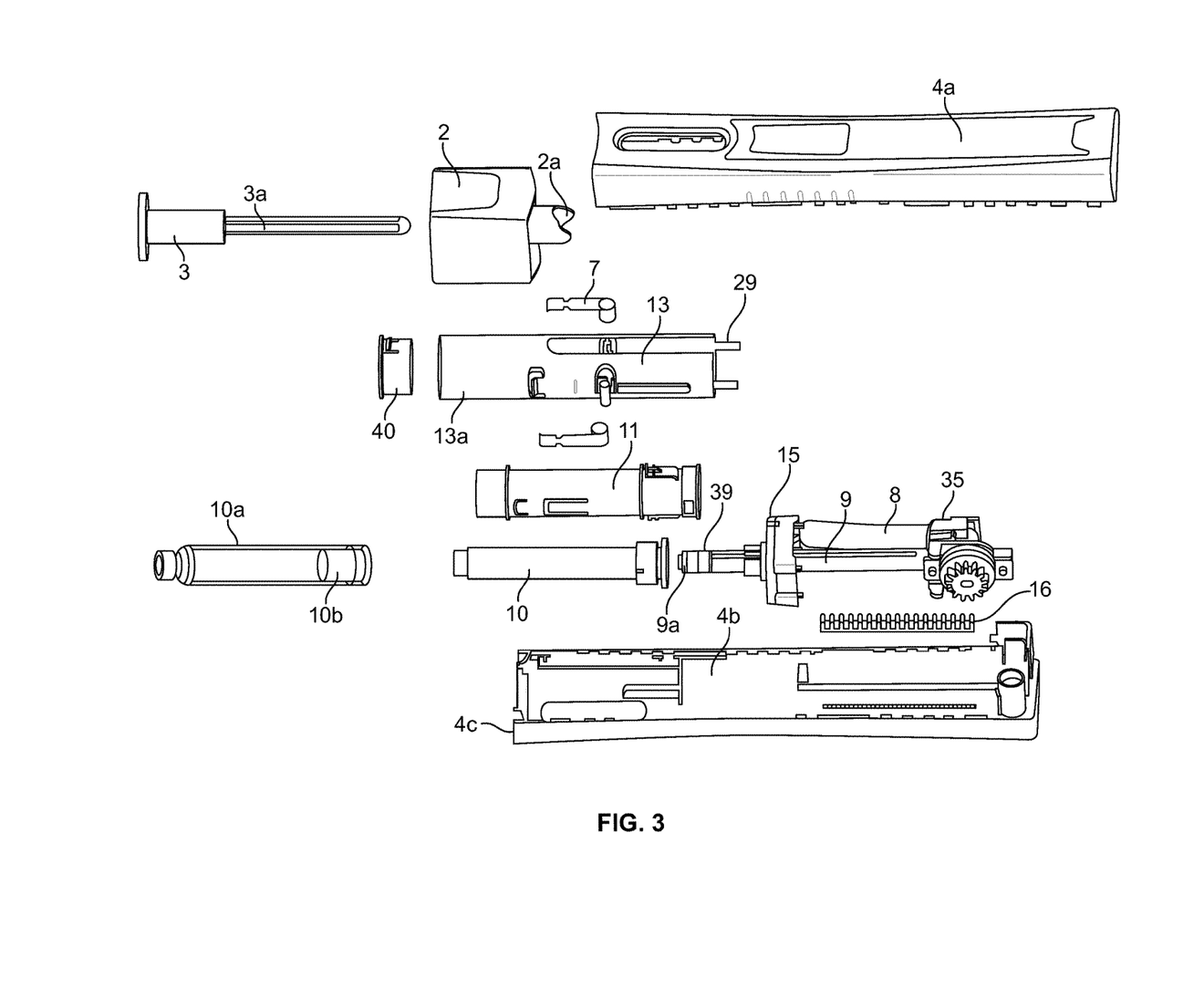
FIG. 3 is a perspective exploded view of the embodiment of FIG. 1 in a disassembled state.

In one embodiment a reusable auto-injection training device 1 according to the invention is shown in FIGS. 1-3 comprising a housing or outer body 4 and a cap 2/mandrel 3 assembly. Although the mandrel 3 may be fabricated separately from cap 2, the two parts are assembled as a single assembly. In other words, once assembled, preferably cap 2 cannot be separated from mandrel 3. This is a benefit because the cap helps to keep the mandrel 3 to in axially aligned position such that the proximal end of the mandrel can penetrate and move through an opening in the distal end of an included dummy syringe such that it can precisely contact and engage the distal end of a plunger. This engagement pushes the plunger proximally to reset the training device.

The outer body 4 has a scroll window 6 located at the proximal end where the housing 4 is preferably comprised of an upper body housing 4a and a lower housing body 4b, each preferably comprising a thermoplastic material. These two body housings can be attached during manufacturing by pins, tongue & groove, snap fit, glue, fasteners, welding or any other known process to provide a secure connection.

FIG. 3 illustrates mandrel 3 that has a shaft 3a extending in the proximal direction with a proximal end configured as a contact or bearing surface to engage the distal end 9a of plunger 9. The mandrel 3 is used to reset the training device by pushing shaft 3a through hollow channel 2a in cap 2 to penetrate the distal end of demo syringe 10 and then to engage the distal end 9a of plunger 9 causing it to move proximally relative to housing 4 and container 10 and carrier 11 that holds the container fixed relative to the housing such that the container 10 and carrier 11 are axially fixed relative to the housing.

Until it reaches a cocked or activated first position. As plunger assembly 35 is retracted proximally (i.e., reset) by mandrel 3, plunger spring 9 is unwound from spool 37 located at the proximal end of plunger spring 8 and fixed to the plunger assembly 35 (see FIG. 4). The opposite end of spring 8, i.e., the distal end 36, is attached to lock carrier 15 through connectors 38. Lock carrier 15 is axially fixed to the lower housing 4b such that there is no relative movement between the lock carrier 15 and the housing 4. This provides a fixed or anchor position for the distal end 35 of plunger spring 8. Because spool 37 is fixed to the proximal end of the plunger assembly 35 it will move relative to the distal end 36 of the spring and the lock carrier 15. As the plunger assembly moves proximally during resetting, the spring 8 is unwound from spool 37 as illustrated in FIG. 3. This creates a tension or winding force in the plunger spring tending to oppose the proximal movement of the plunger assembly and tending to pull the plunger assembly back in the opposite distal direction in order to rewind the spring around spool 37. This winding force is the driving force that allows the plunger to move distally during activation of the training device to simulate an injection.

Preferably, the plunger spring 8 is composed of spring steel, plastic with memory, or other material that can be repeatedly unwound with an applied force from the mandrel and has self-rewinding property that uses the stored applied force generated during resetting. The spring can be a constant force spring or a variable force spring. Preferably, the spring is a constant force with a set value of approximately 650 Gram Force. Such a spring is also known as torsion flat spring. In some applications the spring can be composed of a single layer of spring material or be formed as a composite or laminate of the same materials or varying materials depending on the force profile that is to be simulated based on the commercial injection device. Typically metal is used to fabricate these types of springs that perform repeated action force with self-coiling to its original position with minimum of deformity and characteristic changes. The common metal used is stainless steal or equivalent metal, which will have the precise repeatability of the desired force in a very short distance uncoiling motion while maintaining its full integrity and characteristic as it is repeatedly uncoiled and coiled with a specific constant torsion force. These types of springs require less space than a compression spring and thus can be designed for placement in the device in very short and tight areas where a compression spring would not fit.

Figure 4:
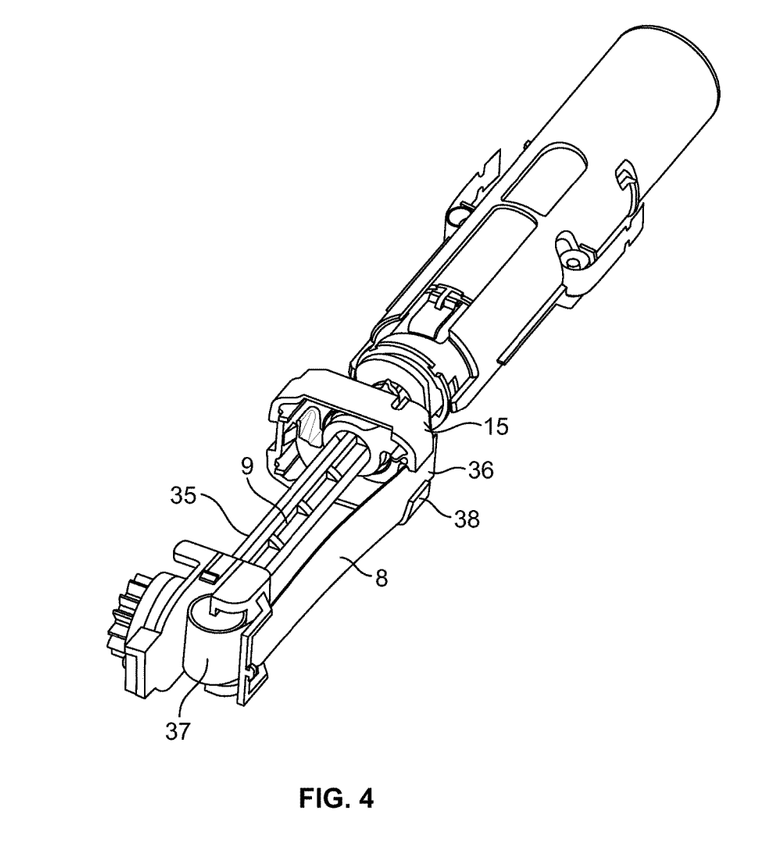
FIG. 4 is a perspective view of the embodiment of FIG. 1 without the housing and attached components.

Similar in design to the plunger spring 8 is shield spring 7 as shown in FIGS. 2-4. This spring 7 is used to bias the safety or needle shield 13 in a first stand-by position where the distal end 13a, with attached shield ring 40, protrudes out of the distal end 4c of housing 4. The distal end 7a of spring 7 is fixed to housing 4b and the proximal end or coil is fixed to a post or protrusion in the outer surface of shield 13. Shield 13 simulates an actual needle shield of a commercial auto-injector that covers or shields the needle from the user's view and provides user protection from accidental needle sticks. Shield 13, like a real commercial auto-injector, is configured to slide axially relative to housing 4, but is rotationally fixed relative to the housing. To move the shield 13 from the stand-by position to an activate position, the user places the shield ring 40 against a pretend injection site and pushes or moves the housing distally towards the pretend injection site. This causes the shield 13 to slide proximally relative and into the housing 4 until fingers 29 engage lock 14 (see FIGS. 5 & 6). This engagement of fingers 29 with lock 14 occurs through finger through holes 30 located in lock carrier 15. As the shield 13 slides proximally, springs 7 are unwound from the proximal coil end that is attached to the shield 13 thus creating a tensioning force similar in nature to the spring force described above in relation to the unwinding of plunger spring 8 when the plunger assembly is reset. This tensioning or winding force urges spring 7 to rewind itself pulling or urging the shield 13 in the distal direction. Once the shield has reached the activate position the distal end of shield ring 40 becomes approximately flush with the distal end 4c of housing 4.

Figure 5:
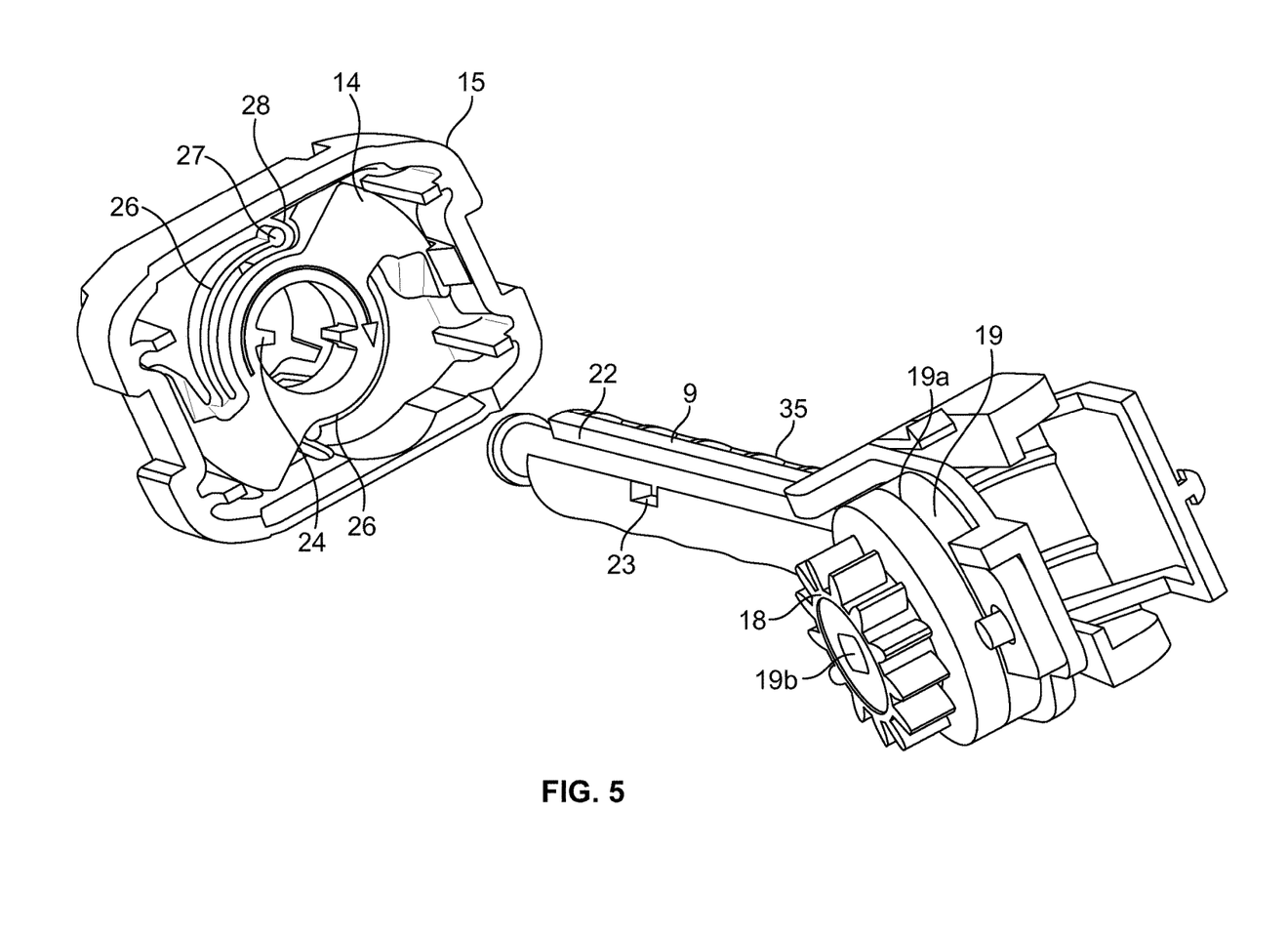
FIG. 5 is a close-up perspective view looking distally of the plunger locking components and the plunger according to the invention.
Figure 6:
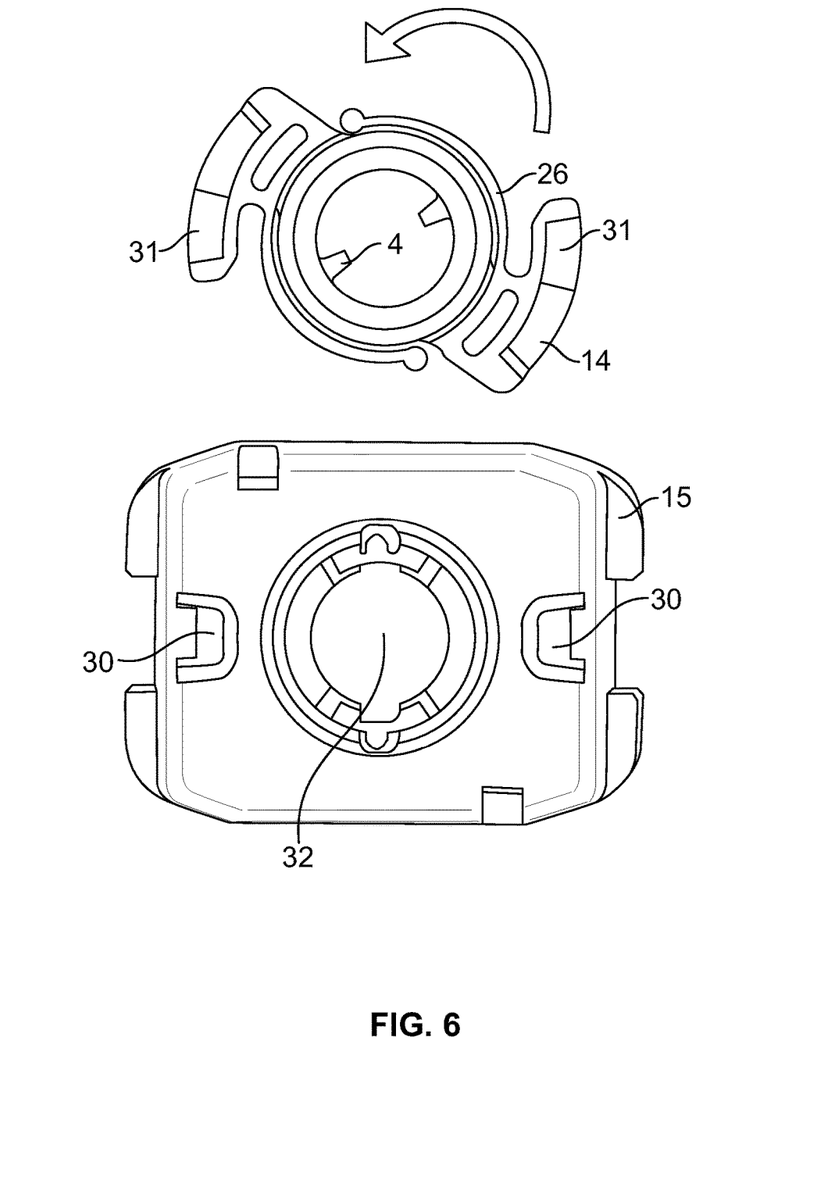
FIG. 6 is a close-up view of the lock carrier and the looking proximally according to the invention.

In arriving at the activate or triggering position, the shield fingers 29 contact lock ramps 31 in a bearing surface relationship where the ramp surface slides relative to the bearing surface at the proximal end of the finger. Since the shield 13 is rotationally fixed relative to the housing, this bearing contact cause's lock 14 to rotate counterclockwise when viewed in the proximal direction as shown in FIG. 6. As shield 13 cannot rotate the fingers impart a rotating motion of lock 14 relative to lock carrier 15, which is also rotationally and axially fixed to the housing 4. Spring arms 26 on lock 14 engage catches 28 of the proximal inside surface of lock carrier 15 through spring stops 27 as shown in FIG. 5, as the lock 14 is rotated in the direction shown by the arrow in FIG. 5, the spring arms 26 provide a counter biasing or return force that urges the lock 14 to counter-rotate in the opposite direction. Lock 14 has a plunger through hole that has an inner surface generally matching the external diameter or shape of plunger 9. This inner surface has one or more protruding keys 24 extending radially inward and configured to engage plunger 9 in either a key notch 23 or a longitudinal slot 22. When two keys 24 are used as illustrated in FIG. 5, there will be two notches 23 and two slots 22, each preferably diametrically opposed from each other.

When the plunger 9 is pushed back proximally from the fired position at the end of the simulated injection procedure by mandrel 3, notch 23 on plunger 9 slides relative to key 24. Because the device has been fired or activated to simulate an injection key 24 is positioned in longitudinal slot 22 on plunger 9, which allows the plunger to move axially relative to the lock 14 positioned in lock carrier 15. As plunger 9 and notch 23 moves proximally during resetting the notch will eventually become adjacent to key 24. At that moment, because of the counter rotation force imparted by spring arms 26 this will cause the lock key 24 to rotate into notch 23. This notch is position longitudinally along the plunger so this latching of the key and notch occurs when the plunger assembly 35 has reached the fully cocked position. Although in this cocked position the plunger spring 8 is fully tensioned and urging the plunger assembly to move axially in the distal direction, the engagement of key 24 with notch 23 prevents or prohibits axial movement in either direction. As shown by the direction arrow in FIG. 5, the lock must rotate clockwise in order to disengage the keys 24 from the notches 23 to drop into and engage slots 22. This occurs, as previously described, when fingers 29 contact ramps 31 and rotate lock 14 in the direction illustrated by the arrow. Once keys 24 rotate into slots 22 there is no stop or other obstruction in the slot to prevent plunger 9 from moving distally relative to lock 14 and lock carrier 15.

As stated, plunger spring 8 provides the driving force to move plunger assembly 35 axially in the distal direction when the training device is fired or triggered by the user. No trigger button or switch is required to fire the training device 1 and, as such, there is no mechanism in the device that requires manipulation using the user's fingers to push, flip, de-latch, or otherwise activate in order to fire the device. All that is required to trigger the simulated injection procedure is to press the shield 13 against a pretend injection site.

In order to simulate the feel and sound of a real commercial auto-injector having a pre-filled syringe or a pre-filled cartridge of medicine the training device uses either a demo/dummy syringe 10 or a demo/dummy cartridge 10b, referred to herein generally as a container. There is no liquid or other movable substance contained within the demo container, however, the demo container is preferably made from the same materials as the actual real cartridge or syringe, typically glass or plastic, such as poly carbonate materials. This allows the training device to accurately simulate the real friction forces between the inner walls of the container and the sliding piston, bung or stopper, referred to herein generally as a piston. The dummy syringe design allows the training device to have an internal structure having a through hole in the distal that will receive and accurately guide activation mandrel 3 in order to allow the piston or plunger to be pushed back to its locked or pre deactivation position. The inside gliding surface of the dummy container ensures the plunger rod during the deactivation or simulated injection will be guided in an axially straight and precise path. This is accomplished by preferably having a tapered or necked down distal end 10a that preferably has a through hole opening having an inside diameter dimension ID that is about the same as the outer diameter OD of the proximal end of mandrel 3. The demo container is also preferably designed such that the resistance caused by displacing atmospheric air simulates the resistance felt in a real life container pre-filled with a liquid medicament. The dummy syringe also the use of a transparent barrel to provide an additional visual indicia to the user through opening windows 5 on the both sides of the housing 4 where the plunger and piston can be seen moving distally during the simulated injection procedure. As mentioned, the barrel of the demo syringe allows the friction forces of real life prefilled syringe to be simulated by using a silicon coated inner surface of the barrel combined with a sliding siliconized stopper or piston that moves axially with a uniform speed and resistance while simulating the injection or deactivation phase of the drug delivery. Preferably, both the inner surface of the demo container and the outer surface of the piston are coated with silicon.

The piston can be a separate item made of the same material as the real pistons used in syringes and cartridges and can be slidably positioned inside the barrel of the container. The piston free standing, i.e., not directly fix to or attached to any other component of the training device (see item 10b in FIG. 3) or as shown in the particular embodiment, which uses a demo syringe 10, the piston 39 is preferably fixed to the distal end 9a of plunger 9 as shown in FIG. 3. Most preferably, a portion of the distal end 9a protrudes or extends distally beyond the distal end of piston 39 to provide a solid and/or non-compressible contact or bearing surface that is used to engage the proximal end of mandrel 3 when it is used to push the piston assembly proximally to reset the training device.

The demo container is positioned in and held axially fixed by carrier 11. Carrier 11 is required because it provides an additional housing component to the dummy syringe as well as an axial alignment feature for the syringe shield. The carrier also allows dummy container to rest on top of the syringe ring which is holding the dummy container and carrier in a manner that the dummy container will have minimum rotation and or movement as a result of the activation or deactivation phases and repeated actions by a user.

To further simulate a real-life auto-injection experience the training device 1 uses a rotary damper 19 that has an attached gear wheel 18, collectively referred to herein as a gear assembly, which is rotatably engaged with rack 16 that is axially fixed parallel to the longitudinal axis of housing 4b. The gear assembly comprises a solid gear wheel 18 mounted on a shaft or axle 19b (see FIG. 5). The opposite end of the axle is captured in the gear assembly housing 19a, the internals of which are designed to provide a controlled motion or torque of the axle and the attached gear wheel 18 as it rotates along the fixed linear rack 16 in the distal direction inside the housing 4 of training device 1. The solid gear wheel 18 is rotationally fixed to the axle 19b such that it cannot rotate around or relative to the axle. Preferably, the solid gear wheel is tightly press fitted onto the axle to prevent any relative rotation between the axle and gear wheel.

The other end of the axle 19b that is captured in the housing of the rotary damper is subject to frictional forces through the use of an O-ring or the engagement/contact with a viscous medium, such as grease, or with other structural members within housing 19a to generate frictional forces and to create the necessary torque to achieve the controlled desired rotation of the axle and gear wheel. Without the rotary damper 19, the plunger spring 8 would drive the plunger assembly distally after firing a speed much faster than that realized with a commercial injection device using a pre-filled container of medicament. As such, the particular design of the rotary damper and/or the sizing of the gear and rack is chosen to cause the axle to rotate at a constant rate under a relatively constant torque, which in turn causes the gear wheel to move along the rack to propel the plunger assembly distally at a constant rate as the plunger spring 8 rewinds unto spool 37. Because the plunger 9 is integral and fixed to the plunger assembly 35, which can only move axially as a result of the engagement of gear 18 and fixed stationary rack 16, the plunger is non-rotatable relative to the housing 4. Since the training device can be reset and reused multiple times, the rotary damper 19 necessarily needs to operate in the reverse direction where the axle is caused to rotate in the opposite direction as the gear wheel is rotated and moved proximally along rack 16 when the mandrel 3 is used to push the plunger assembly 35 proximally.

Figure 7:
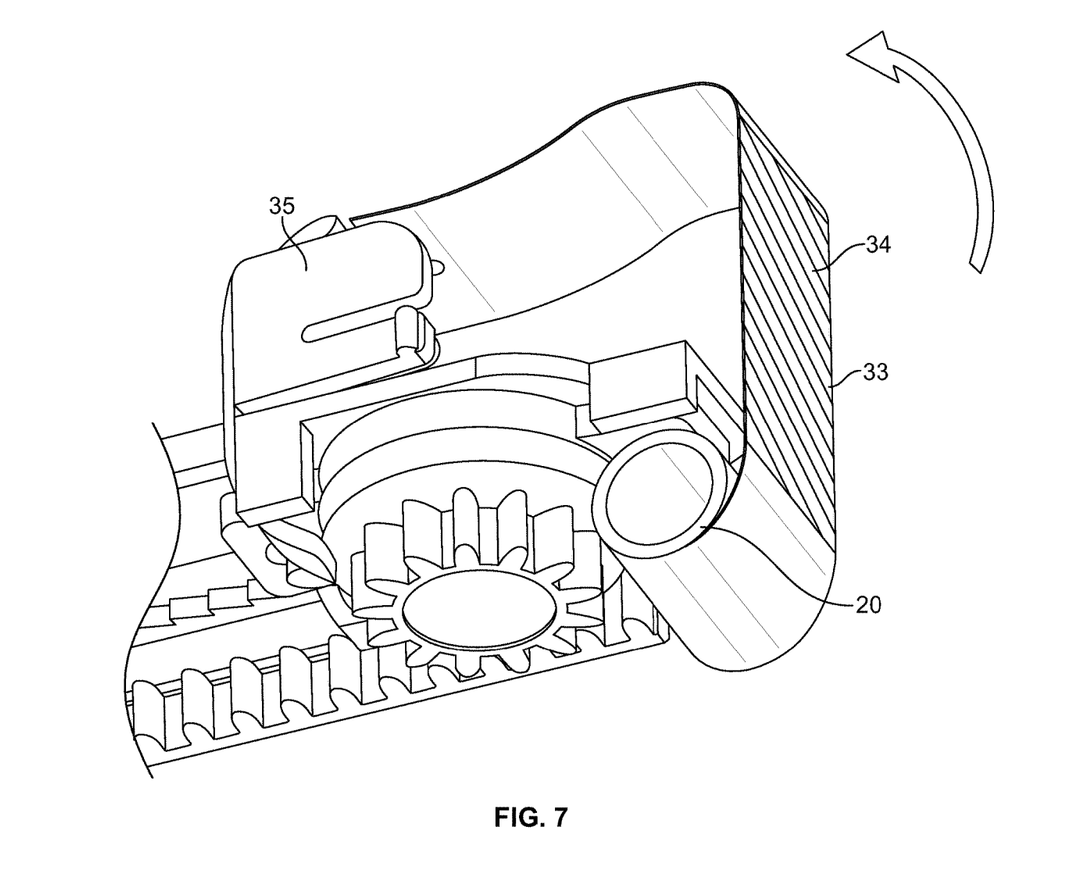
FIG. 7 is a perspective exploded view of the proximal portion of the plunger assembly with the attached tape.

Training device 1 also generates an audible noise or signal to the user as the simulated injection proceeds from the start to the end. This audible feature is achieved preferably by the use of a clicker track 17 fixed to the housing 4b and engaged by a flexible clicker arm 21 attached to plunger assembly 35. As illustrated in FIG. 2, a preferred configuration uses two clicker arms 21 and two clicker tracks 17 diametrically opposed to each other. One clicker track is axially fixed and parallel to the longitudinal axis of the inside surface of housing 4b and the other clicker track is similarly axially fixed to the inside surface of housing 4a. One clicker arm 21 is located on the top portion of plunger assembly 35 as shown in FIG. 2 and the other clicker arm (not visible) is located on the underside or bottom of the plunger assembly 35 to engage the clicker track 17 shown in FIG. 2. As the plunger assembly moves distally during the injection simulation the clicker arm engages the clicker track and rides up and over the teeth positioned longitudinally along the track 17 causing a "clicking" sound that is heard by the user. The teeth separation and configuration is selected such that each click preferably simulates the delivery of a unit dose of pretend medicament from the demo pretend pre-filled container. The design of the clicker arm 21 and clicker track 17 must take into account the resetting and reuse feature of the training device and, as such, must allow the plunger assembly to move in the opposite proximal direction during resetting. In other words, the engagement of the clicker arm and clicker track must not be unidirectional, but instead must be bidirectional. Preferably, resetting of the plunger assembly will also generate a similar or different sound to signal the user that device is being reset. Once the noise stops the user will know that the device has been reset fully The scroll window 6 located at the proximal end of housing 4 allows the user to watch a moving scroll of tape 33 unwind as the simulated injection procedure is in progress. The window can be comprised of any clear, transparent or translucent material that will allow the user to see movement of tape 33. Preferably the window is constructed or formed as a lens to magnify the appearance of tape 33. The observation of the moving tape 33 provides a visual signal to the user of when the simulated injection begins, as it progresses, and when the injection ends. The progress scroll or tape 33 is mounted on scroll spindle 20 as illustrated in FIGS. 2 and 7. Preferably, the tape 33 contains indicia 34 that provide the user with a visual signal through window 6 that the tape is moving in the direction of the arrow in FIG. 5 as the simulated injection progresses. Spindle 20 is fixed to lower housing 4b and is prevented from moving axially, but is allowed to rotate about the stationary fixed axial position. The end of the tape opposite spindle 20 is fixed or attached to plunger assembly 35 and moves axially in the distal direction as shown by the arrow in FIG. 7 during activation of the simulated injection process. As the plunger assembly 35 moves distally it pulls tape 33 in the direction of the arrow thus unwinding the tape from spindle 20 and preferably revealing indicia 34, which in turn shows the user movement of the tape signaling that the injection process, is progressing. At the completion of the simulated injection sequence when the plunger assembly 35 has traveled to its terminal or final distal position, the tape 33 has been unwound from spindle 20 but remains connected to the spindle. Preferably tape 33 is composed of a material that is resilient and has memory, like spring steel or a plastic composite with memory, such that as the plunger assembly 35 is reset, the tape will rewind back onto the spindle to the starting position. This rewinding process is analogous to that used in hand held tape measures that have automatic rewind features. Alternatively, the spindle may be connected to a biasing assembly or component, such as a spring, such that the biasing component is stressed or tensioned as the tape is unwound. During resetting of the plunger assembly the biasing component causes the spindle to reverse rotation direction and rewinds the tape to the starting position.

It is to be understood that the embodiments described above and in the drawings are to be regarded only as non-limiting examples of the invention and that they may be modified in many ways within the scope of the claims. This application is therefore intended to cover any variations, uses or adaptations of the invention using its general principles. Further, this application is intended to cover such departures from the present disclosure as come within known or customary practice in the art to which this invention pertains.

The invention claimed is:

1. A training device for simulating an injection procedure experience when using a real-life fully functional auto-injection device containing a pre-filled container of medicament, the training device comprising,
an elongate outer housing having an inner surface, a proximal end and a distal end, the outer housing containing,
a demo container axially and rotationally fixed relative to the outer housing;
a plunger assembly having a non-rotating plunger, where a distal portion of the plunger is slidable within the demo container;
a coiled spring having a distal end fixed axially relative to the outer housing and a proximal end attached to the plunger assembly such that the coiled spring is in an extended partially uncoiled tensed configuration when the plunger assembly is in a cocked position;
a rotary damper gear assembly attached to a proximal end of the plunger assembly and having a gear rotatably engaged with a rack axially fixed to the inner surface of the outer housing; and
a rotatable lock having a first position where the lock is engaged directly with the plunger to prevent the plunger from moving axially and a second position where the lock is disengaged from the plunger to allow the plunger to move axially relative to the lock and outer housing.

2. The training device of claim 1, wherein the proximal end of the outer housing comprises a window that allows a user to visually observe a scrolling tape that moves during the simulation of an injection.

3. The training device of claim 1, wherein the spring is in a coiled less tensed configuration when the plunger assembly is in a fired position where the simulated injection is complete.

4. The training device of claim 1, wherein the outer housing further comprises a shield axially slidable relative to the outer housing, where the shield has at least one finger at a proximal end to engage the rotatable lock.

5. The training device of claim 4, wherein the at least one finger and the rotatable lock are configured with bearing surfaces such that axial movement of the at least one finger in contact with the lock causes the lock to rotate to the second position to initiate the simulated injection procedure.

6. The training device of claim 4, where the shield is connected to a biasing element that urges the shield to move distally such that a portion of the shield protrudes from the distal end of the outer housing when the plunger assembly is in the cocked position.

7. The training device of claim 1, wherein the rotatable lock has a key that engages a notch in the plunger when the lock is in the first position and where the key is positioned in a longitudinal slot in the plunger when the key is in the second position.

8. The training device of claim 1, wherein the rotatable lock is positioned in a lock carrier axially fixed relative to the outer housing such that when the lock is in the second position it is rotationally biased such that it will move to the first position when the plunger assembly is moved proximally during resetting.

9. The training device of claim 1, wherein the outer housing further comprises a clicker mechanism that generates an audible sound during the simulated injection procedure.

10. The training device of claim 9, wherein the clicker mechanism comprises a clicker arm on the plunger assembly that engages teeth on a clicker track that is axially fixed relative the outer housing.

* * * * *